UNITED STATES PATENT OFFICE.

PAUL GRUBER AND HARRISON C. BASHIOUM, OF PITTSBURGH, PENNSYLVANIA; SAID BASHIOUM ASSIGNOR TO SAID GRUBER.

COMPOSITION OF MATTER PRODUCED FROM CORNCOBS.

1,427,378.  Specification of Letters Patent.  Patented Aug. 29, 1922.

No Drawing.  Application filed October 18, 1920. Serial No. 417,710.

*To all whom it may concern:*

Be it known that we, PAUL GRUBER and HARRISON C. BASHIOUM, citizens of the United States, residing at Pittsburgh, in the county of Allegheny and State of Pennsylvania, have invented certain new and useful Improvements in Composition of Matter Produced from Corncobs, of which the following is a specification.

Our invention relates to a new composition of matter which is produced from corncobs and suitable for use as a lumber substitute.

It is a matter of common knowledge that millions of bushels of corncobs are produced every year and that, at this time, practically no commercial use is made of them. It is the object of the present invention to produce a composition of matter, using corncobs as a base, suitable as a lumber substitute in applications where a high tensile strength in the material is not required, and to provide a substance of this kind which may be shaped by woodworking tools the same as lumber.

According to the present invention, the corncobs are ground or broken, after which they are reduced to a form of pulp. This may be done by any well known digesting process, as by the use of an alkaline substance. We prefer, however, in order not to injure the corncob fibres, to reduce the cobs after being ground by a process not requiring the use of chemicals. In this process, the ground cobs are sprinkled with water until saturated, after which they are cooked in a closed receptacle at a temperature ranging between 120 and 160 degrees centigrade for a period of time between one half and two hours.

After the cobs have been treated, either with or without chemicals, the resulting mass preferably is placed in a press and the greater portion of liquid in the cob is expressed. The bulk of soluble colloidal material in the cob is carried off with this liquid. When the cobs have been treated in the manner above described without the use of chemicals, the colloidal matter thus expressed is a natural mucilage, which, when further evaporated, forms a useful adhesive. This same fluid, when further treated, may be made to yield certain sugars as well as furfural. When the cobs are subjected to the action of alkali, this useful colloidal matter is destroyed so far as recovery by any known simple commercially practical process is possible. Cooking with an alkali has the advantage, however, of producing a fine white pulp.

The resulting flaky, fibrous mass which is left after the removal of the liquid by pressing is then preferably, though not necessarily, dried. A suitable binder of a desired consistency is mixed with this solid matter and the mass is thoroughly kneaded, either at ordinary or elevated temperatures, according to the nature of the binder. The consistency of the mass and of the binder depends on whether the material is to be pressed into form in moulds, or rolled into sheets.

If artificial blocks are to be manufactured, as little liquid as possible is introduced into the pulp with binder. The mixture is then placed in a mold and subjected to pressure at ordinary or elevated temperatures, depending again on the nature of the binder, the applied pressure being 1000 pounds per square inch, or in excess thereto. Pressure as high as 40,000 pounds has been applied, but such high pressure is not necessary for producing a commercially practical and satisfactory material. A pressure of about 3,000 pounds is a very desirable one.

After pressing, the product is stripped from the mold and dried very slowly, preferably at ordinary temperatures at first, and then at elevated temperatures. While drying, the molded article may shrink as much as 10 per cent, although usually there is practically no shrinkage or very little, this depending on the binder.

The dried material is a hard product, the weight of which approximates the weight of light wood. It may be readily worked in a wood turning lathe, producing shavings and does not ordinarily chip. We have found that the material is very desirable for making spools, and it is estimated that they can be produced more cheaply than similar spools from birch wood. The material can also be readily worked with equal success with other wood working tools. It is pleasing in appearance, and is adapted for a large number of other uses, such as picture frames and mouldings.

Instead of molding the pulp in a press, the mass of pulp and binder may be made more fluid and shaped with rolls to form a wall board of the desired thickness and width.

As a binder, we prefer to use a protein, and preferably a binder formed from casein, as sodium caseinate. Such a binder produces a hard material having a minimum shrinkage, is substantially moisture proof, has a pleasing appearance, and may be readily turned on a lathe without chipping. The casein may be rendered waterproof by any accepted method, as by treatment with formaldehyde. Oxidizing oils, such as castor or linseed oils, may be introduced in a casein binder to increase the elasticity of the product. Glue and gelatin are also classed as a protein binder.

As other binders, depending on the use to which the material is to be put, we may employ other well known substances, which include carbohydrates, as starch and hydrocelluloses; hydrocarbons of the asphaltum type, particularly useful in making a moisture proof wallboard; resin binders including natural and synthetic resins, such as well known phenolic condensation products. Oxidizing oils alone or in combination with other binders may be employed.

The natural adhesive contained in the cob and extracted after cooking, may, under some circumstances, be concentrated and used as the binder. In some instances, the cobs may be ground and cooked with water, after which excess moisture is removed by evaporation, and the natural adhesive remaining in the pulp may act as a binder.

The material when formed with casein binder is hard and tough and will not split readily, although the properties of the product depend largely on the binder. For this reason, it can be drilled and fastening devices, such as nails and screws, may be driven therein with less danger of splitting than in wood.

We claim:—

1. A composition of matter used as a substitute for lumber comprising a pulp produced from corncobs, and a casein binder, pressed into shape and dried.

2. A composition of matter used as a substitute for lumber comprising a pulp produced from corncobs, a casein binder, and an oxidizable oil, pressed into shape and dried.

3. The process of producing a substitute for lumber which consists in cooking ground corncobs with water, removing excess moisture and soluble colloidal matter after cooking, mixing the resulting pulp with a binder, pressing the mixture into shape, and drying the product.

4. A substitute for lumber comprising a dried composition of pulp derived from cooked corncobs and a protein binder.

5. A substitute for lumber comprising a dried composition of pulp derived from cooked corncobs only and a binder, said composition being capable of being worked by wood working tools.

6. A substitute for lumber comprising a self-supporting composition of pulp derived from corncobs cooked under pressure, and a binder.

7. A substitute for lumber comprising a self-supporting composition of pulp produced from cooked corncobs only and free of soluble colloidal matter, and a binder.

8. An artificial lumber comprising a homogeneous fibrous mass obtained from cooked corncobs united with a binder.

9. An artificial lumber comprising a homogeneous fibrous mass obtained from cooked corncobs and united with a protein binder.

10. The process of producing a substitute for lumber which consists in cooking corncobs under pressure to obtain a pulp, mixing the resultant pulp with a binder, pressing the mixture into shape and then drying it, first at ordinary temperatures and then at temperatures above normal.

11. The process of producing a lumber substitute which consists in reducing corncobs only to a pulp by cooking, mixing the pulp with a binder, subjecting the mass to pressure in molds, removing the mass from the molds, and allowing it to dry.

In testimony whereof we affix our signatures in presence of two witnesses.

PAUL GRUBER.
HARRISON C. BASHIOUM.

Witnesses:
Lois T. Wineman,
Wm. H. Parmelee.